United States Patent
Burkhart, Sr.

(10) Patent No.: US 10,132,201 B2
(45) Date of Patent: Nov. 20, 2018

(54) ULTRA-HIGH-EFFICIENCY CLOSED-CYCLE THERMODYNAMIC ENGINE SYSTEM

(71) Applicant: Burkhart Technologies, LLC, Cincinnati, OH (US)

(72) Inventor: James A. Burkhart, Sr., Cincinnati, OH (US)

(73) Assignee: Burkhart Technologies, LLC, Cincinnati, OH (US)

( * ) Notice: Subject to any disclaimer, the term of this patent is extended or adjusted under 35 U.S.C. 154(b) by 0 days.

(21) Appl. No.: 15/669,282

(22) Filed: Aug. 4, 2017

(65) Prior Publication Data

US 2017/0356311 A1    Dec. 14, 2017

Related U.S. Application Data

(63) Continuation-in-part of application No. 14/522,117, filed on Oct. 23, 2014, now abandoned.

(60) Provisional application No. 61/895,445, filed on Oct. 25, 2013.

(51) Int. Cl.
| | |
|---|---|
| *F01K 25/10* | (2006.01) |
| *F24J 3/06* | (2006.01) |
| *F24J 3/08* | (2006.01) |
| *F24V 50/00* | (2018.01) |
| *F24T 10/00* | (2018.01) |

(52) U.S. Cl.
CPC .......... *F01K 25/103* (2013.01); *F01K 25/106* (2013.01); *F24J 3/06* (2013.01); *F24J 3/08* (2013.01); *F24T 10/00* (2018.05); *F24V 50/00* (2018.05)

(58) Field of Classification Search
CPC .. F01K 25/00; F01K 25/08; F05B 9/02; F05B 2400/141
See application file for complete search history.

(56) References Cited

U.S. PATENT DOCUMENTS

| | | | |
|---|---|---|---|
| 1,961,784 | A | 6/1934 | Roe |
| 2,982,864 | A | 5/1961 | Furreboe |
| 3,224,199 | A | 12/1965 | Best |
| 3,857,244 | A | 12/1974 | Faucette |
| 4,218,891 | A | 8/1980 | Schwartzman |
| 4,292,809 | A | 10/1981 | Bjoerklund |
| 4,475,343 | A | 10/1984 | Dibelius et al. |

(Continued)

FOREIGN PATENT DOCUMENTS

| | | |
|---|---|---|
| JP | 2005-077050 A | 3/2005 |
| JP | 2005-337065 A | 12/2005 |

OTHER PUBLICATIONS

Liquid Air Energy Storage Pumped Hydro Capability No Geographical Constraints. Published Nov. 2017.

*Primary Examiner* — Jonathan Matthias
(74) *Attorney, Agent, or Firm* — Gardner, Linn, Burkhart & Ondersma, LLP

(57) ABSTRACT

A thermodynamic system and method for performing work includes a working fluid and a fluid pump for pumping the working fluid through a cycle. A thermal input supplies heat to the working fluid. An expansion device downstream of the thermal input converts at least the heat of the working fluid to useful work. A heat exchanger downstream of the expansion device has a first portion to transfer heat from downstream said expansion device to a second portion at or upstream of said thermal input. A conversion device expands the working fluid with constant enthalpy from a higher to a lower pressure.

30 Claims, 15 Drawing Sheets

(56) References Cited

U.S. PATENT DOCUMENTS

| | | |
|---|---|---|
| 4,905,481 A | 3/1990 | Scaringe et al. |
| 5,419,117 A | 5/1995 | Greene |
| 6,041,604 A | 3/2000 | Nicodemus |
| 7,062,913 B2 | 6/2006 | Christensen et al. |
| 7,866,157 B2 | 1/2011 | Ernst et al. |
| 8,707,701 B2 | 4/2014 | Burkhart |
| 2008/0006040 A1 | 1/2008 | Peterson et al. |
| 2008/0041057 A1 | 2/2008 | Thomas |
| 2011/0252796 A1 | 10/2011 | Burkhart | ium
ULTRA-HIGH-EFFICIENCY CLOSED-CYCLE THERMODYNAMIC ENGINE SYSTEM

CROSS REFERENCE TO RELATED APPLICATION

This application is a continuation-in-part of U.S. patent application Ser. No. 14/522,117, filed Oct. 23, 2014, which claims priority from U.S. provisional application Ser. No. 61/895,445, filed on Oct. 25, 2013, the disclosures of which are hereby incorporated herein by reference in their entireties.

BACKGROUND OF THE INVENTION

The present invention is directed to an ultra-high-efficiency engine system and corresponding thermodynamic system and, in particular, to such a system that operates in a single loop closed cycle.

Steam is used in typical electric generating plants worldwide. The low pressure return path crosses the wet region of the temperature versus entropy (T vs. S) plot to complete the power cycle, which results in substantial heat loss to the earth environment, and a power plant efficiency only in the 30% range. Both the OTTO (internal combustion) cycle and the diesel engine cycle employ gaseous compressions which consume much power. Both the existing low-efficiency (in the 30% range) cycles map out extensively along the waste heat "x"-axis of the T vs. S plot.

In my U.S. Pat. No. 8,707,701 B2, entitled ULTRA-HIGH-EFFICIENCY ENGINES AND CORRESPONDING THERMODYNAMIC SYSTEM, issued Apr. 29, 2014, are shown numerous power systems in which a heat pump loop is added to a conventional power system to increase the efficiency of the combined cycle power system. The enthalpy of the bottom of the heat pump cancels out the enthalpy of the opposite flowing bottom of the power cycle. Likewise, the compressor of the heat pump cycle uses up a like amount of enthalpy from the vertical part of the power cycle. The result is an ultra-high-efficiency system using two closed cycles, one dominant cycle, and a minor cycle.

SUMMARY OF THE INVENTION

The present invention provides a new cycle is that it does not significantly cross the "so called wet region." Use of heat-exchanger between low-pressure power turbine exiting heat, and incoming high-pressure input heat, resulting in efficiency system well into the 90% range, with miscellaneous heat leaks accounting for a 10% balance.

A single dominate loop thermodynamic system and method for performing work, according to an aspect of the invention, includes a working fluid and a fluid pump, such as a liquid pump for pumping the working fluid through a cycle. A thermal input supplies heat to the working fluid. An expansion device downstream of the thermal input converts at least the heat of the working fluid to useful work. A heat exchanger downstream of the expansion device has a first portion to transfer heat from downstream said expansion device to a second portion at or upstream of said thermal input. A conversion device converts the fluid back to a liquid. The conversion device expands the working fluid with constant enthalpy from a higher to a lower pressure.

The invention is directed to a thermodynamic system and method that may find application in the direct extraction of power from earth surface sensible heat, from the heat of geothermal wells, from the latent and sensible heats of surface water and from the heat in ambient air. No other heat or fuel source is required. However, embodiments of the invention may also find application as a power-producing bottoming system for existing and new fossil-fuel-fired and nuclear power plants and for such engines as Diesel and internal combustion.

These and other objects, advantages, purposes, and features of this invention will become apparent upon review of the following specification in conjunction with the drawings.

BRIEF DESCRIPTION OF THE DRAWINGS

FIG. 7b is the pressure portion of the T vs. S diagram in FIG. 7a;

FIG. 8b is the compression portion of the T vs. S diagram in FIG. 8a;

DESCRIPTION OF THE PREFERRED EMBODIMENTS

Figure 1:
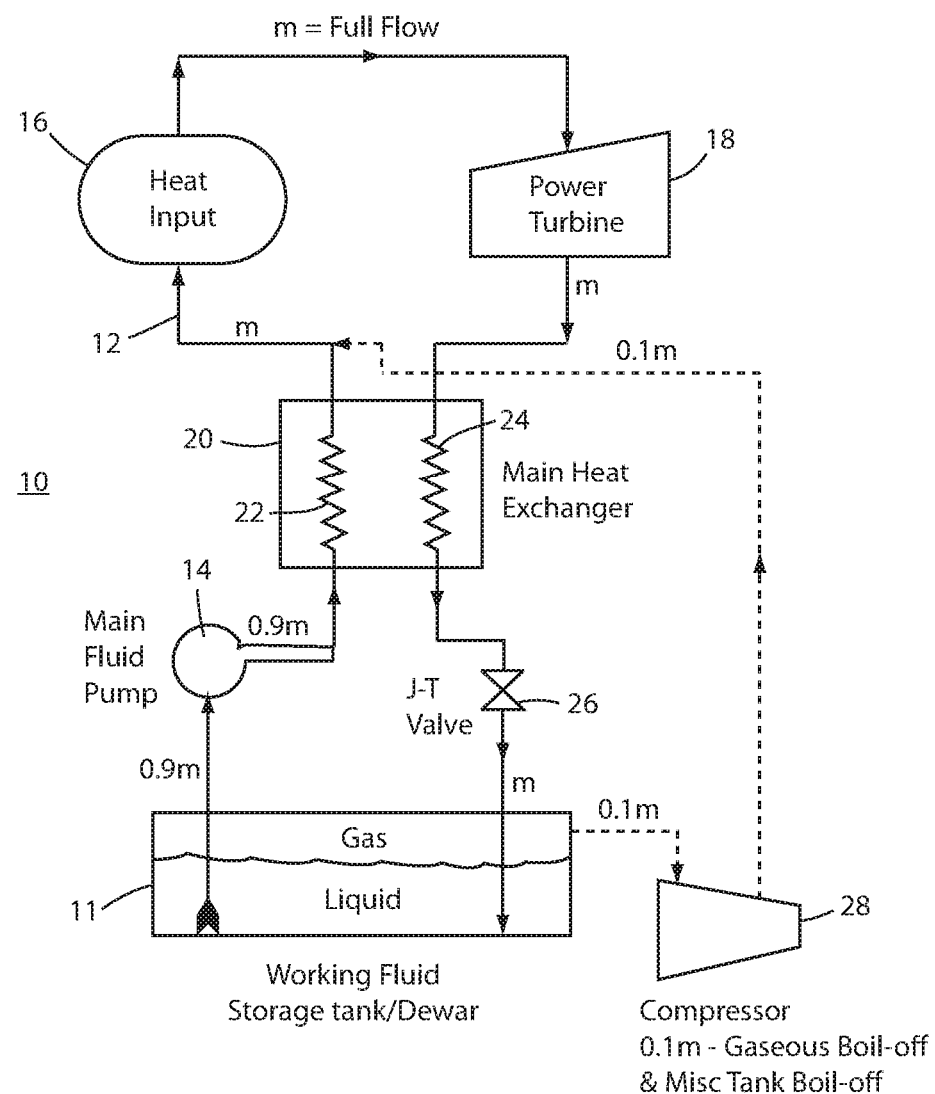
FIG. 1 is a block diagram of a closed cycle thermodynamic system according to an embodiment of the invention.

Referring now to the drawings and the illustrative embodiments depicted therein, a thermodynamic system 10 includes a liquid tank or cryogenic Dewar 11 that is maintained at some nominal pressure near absolute zero or slightly above. A liquid pump 14 elevates a wording fluid 12 in the liquid state to the desired operating pressure. The fluid is heated in a heat absorbing coil 22 of a heat exchanger 20 by the returning low pressure stream passing through a heat transfer coil 24 after it exits an expansion device such as a power turbine 18. The high pressure stream enters a heat source 16 which heats the working fluid to the top temperature of the cycle. The high pressure and the high temperature working fluid enters the power producing gas turbine 18. The working fluid as a low pressure stream exits turbine 18 and transfers its heat to the high pressure stream via heat exchanger 20. The low pressure stream enters a conversion device 26 in the form of a J-T valve, which takes the working fluid from the bottom of low-pressure side 24 of heat-exchanger 20 along a constant enthalpy line, to the bottom of the working fluid tank 11 in the liquid dominated (90%) bottom side of the tank. For some applications, the conversion device maybe a liquid turbine, a gas turbine, or a J-T valve turbine combination. Because the working fluid in liquid form is at the bottom of tank 11, the J-T valve discharges to the bottom portion of tank 11. The closed thermodynamic cycle begins anew at the intake of liquid pump 14.

In the illustrated embodiment, conversion device 26 is a J-T valve. However, other devices performing the same function as a J-T valve could be used. Conversion device 26 operates generally isenenthalpally and may also operate generally isentropically.

The working fluid (m) in tank 11 in the illustrative embodiment is approximately 90% (0.9 m) liquid and 10% (0.1 m) gas. A boiled-off gas compressor 28 compresses the gas from tank 11 to a higher press gas state, and injects the gas output of compressor 28 to top system pressure and merges the approximate 10% gas working fluid with the 90% stream now a gas at the junction between heat absorbing coil 22 and heat source 16.

System 10 may be started by starting the high pressure flow by applying the heat source 16 which will start the turbine 18. After the turbine, the flow will heat the low pressure side 24 of the heat exchanger 20, which will then heat the high temperature side at 22.

Figure 2:
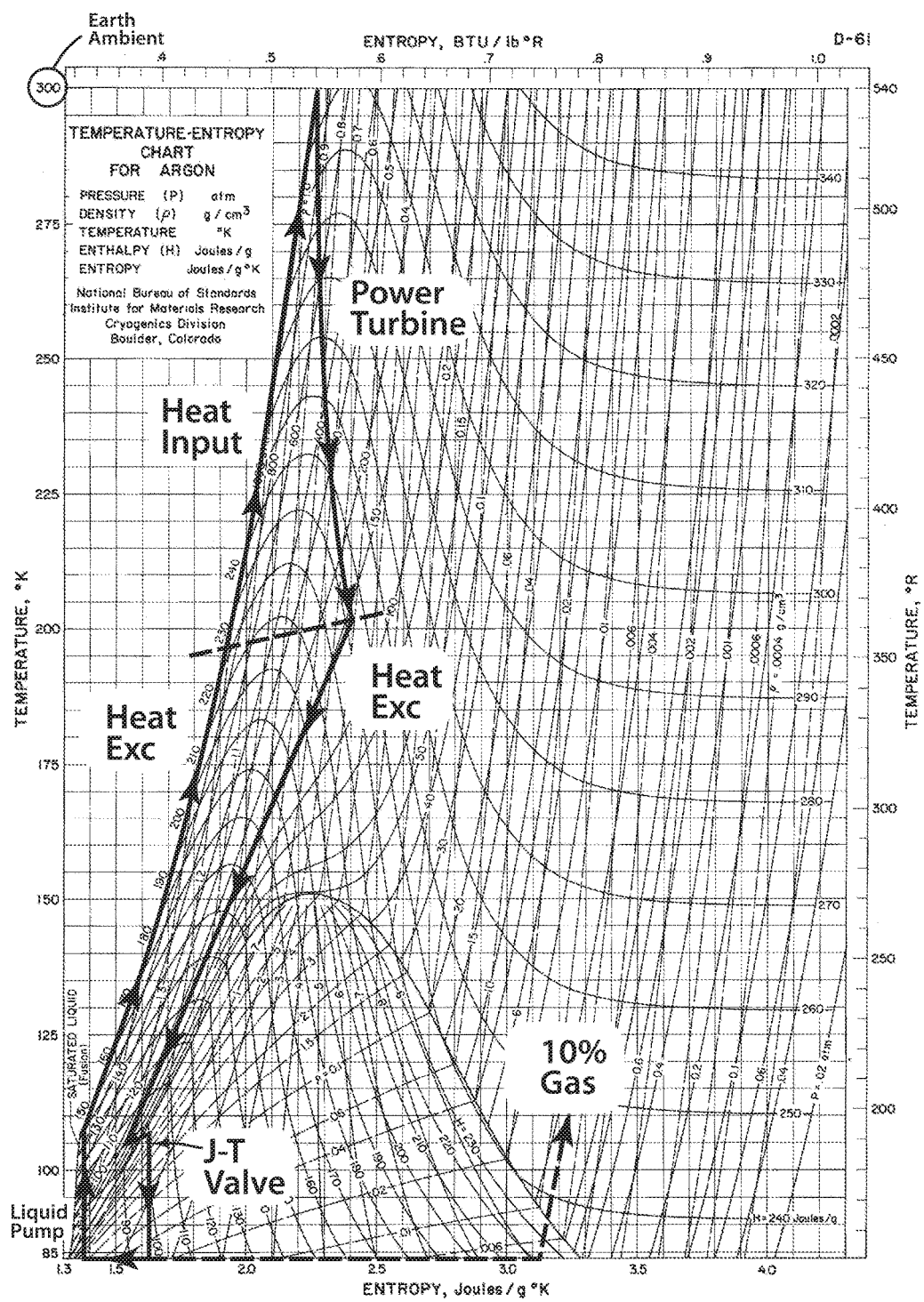
FIG. 2 is a temperature vs. entropy (T vs. S) diagram of the embodiment in FIG. 1.

Referring to FIG. 2, the thermodynamic cycle of system 10 has most of the characteristics of a conventional Rankine cycle, except that the return path goes to the left of the wet region instead of to the right, or through the wet region as is the case with a conventional steam cycle. For steam, the gaseous region above the wet region is very small compared to the wet region, and there is no room to take the return path below the steam turbines. Working fluid 12 has a very substantial gaseous regions in comparison to the wet regions. Working fluid 12 is illustrated in FIGS. 1 and 2 as argon.

Figure 4:
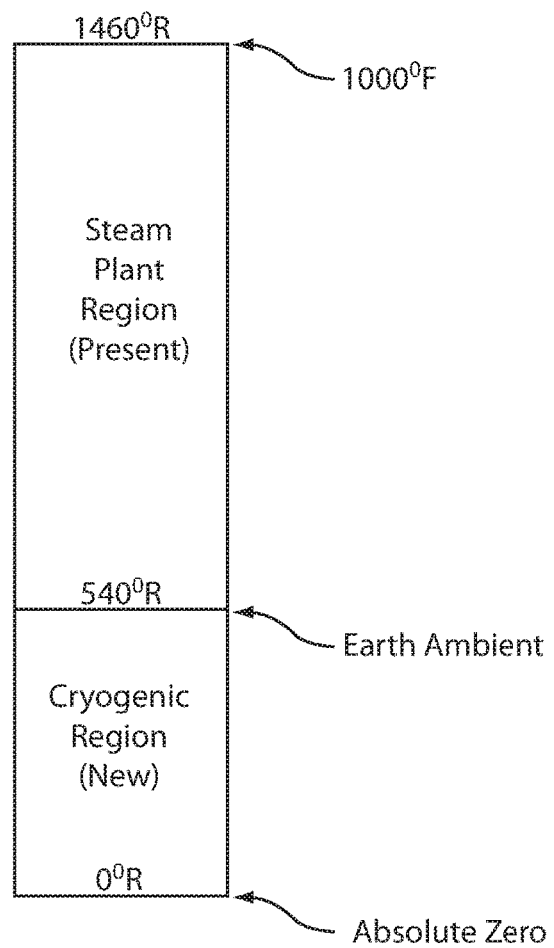
FIG. 4 is a bar chart illustrating temperature region in which the embodiment shown in FIG. 1 operates.

The top temperature of system 10 is illustrated at 300 degrees K, which corresponds to earth ambient temperature. Hence, the very low temperatures of the cycle operates in the cryogenic regime. FIG. 4 illustrates the cryogenic regime compared to the steam cycle regime. The cryogenic regime is about one-half the temperature range of the steam cycle regime. To date the cryogenic cycle regime has not been used for power generation. Such a cycle can be fueled with one of many ambient temperature sources of heat. This is very significant since global heat passing into one of these new cryogenic temperature engines potentially reduces global heating by producing motive or electric power. This ambient heat can be captured by using a piping network buried in the ground, much like that currently used to augment furnaces in winter. Flowing water in a creek or river with a properly designed heat exchanger is another way of gathering in this ambient heat.

This type of cryogenic cycle can also operate as a bottoming cycle operating on the discharge stream from a large coal fired, or nuclear fueled power plant, or the cooling fluid discharge of a Diesel engine, or internal combustion engine. Power plants and present day Diesel and internal combustion engines are somewhere between 30% and 40% efficient. The present invention provides a technique for capturing most of the 60% to 70% of the fuel that goes to heating the atmosphere.

Figure 3:
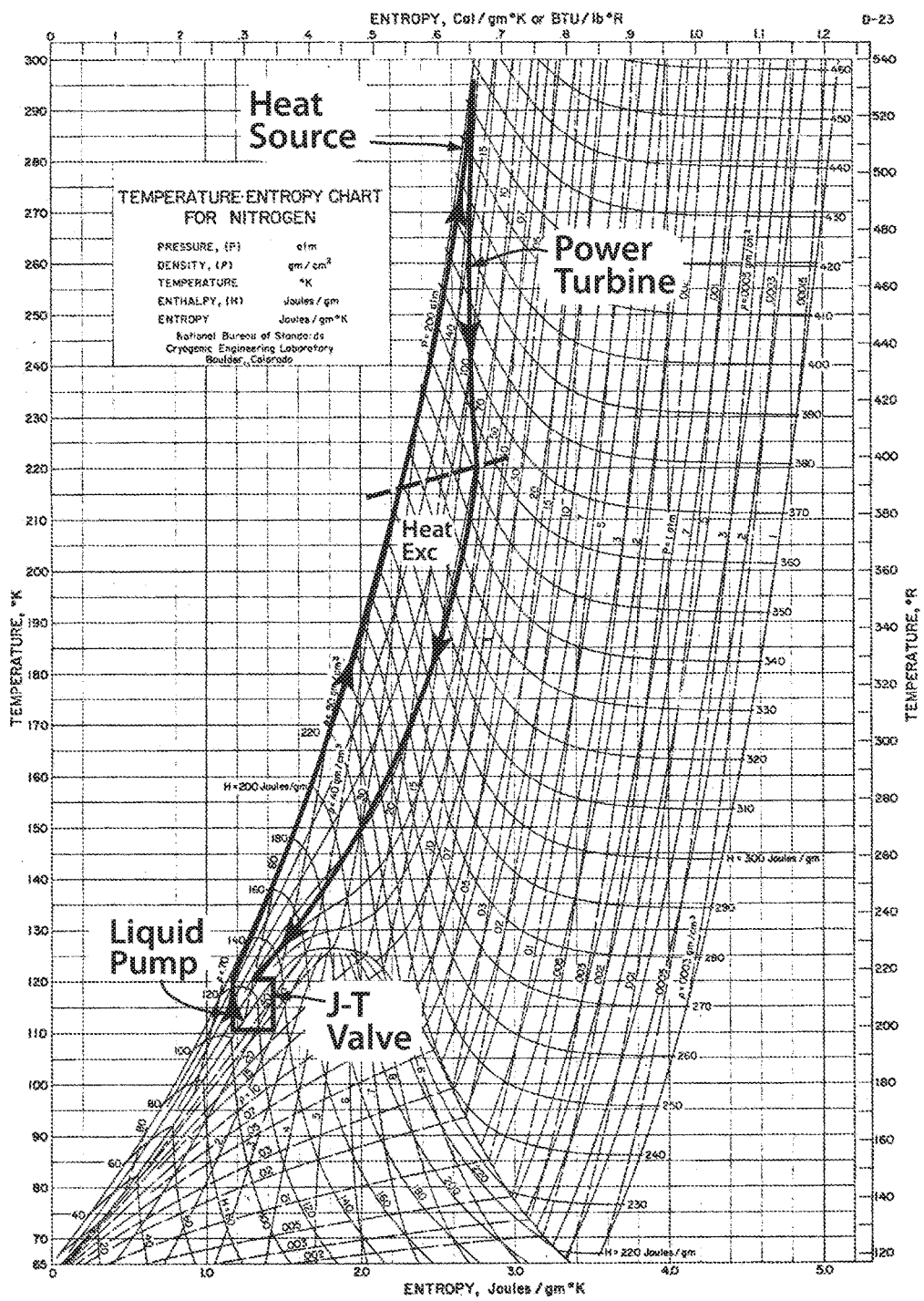
FIG. 3 is the same view as FIG. 2 of a system using Nitrogen as the working fluid.
Figure 5:
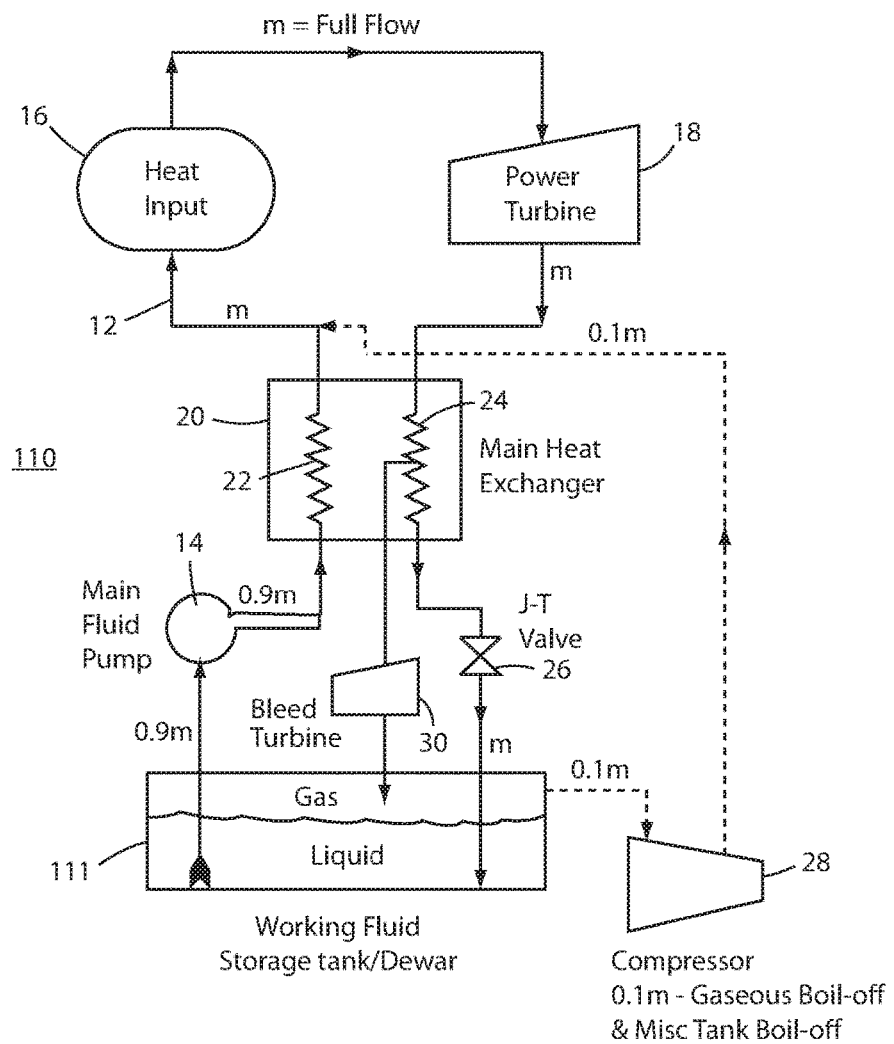
FIG. 5 is the same view as FIG. 1 of another embodiment of the invention.
Figure 6:
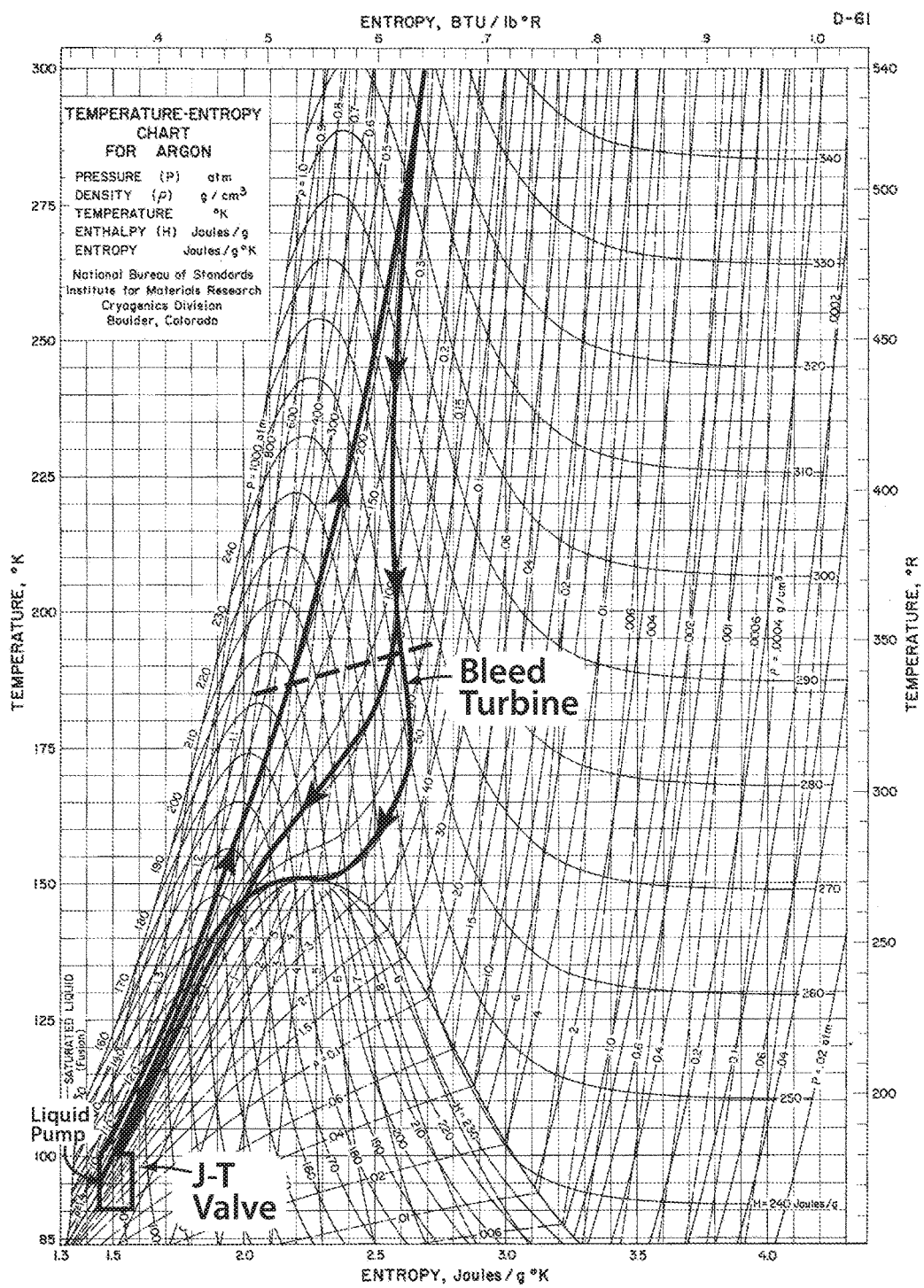
FIG. 6 is the T vs. S diagram of the embodiment in FIG. 5.

FIG. 3 shows that nitrogen is a potential candidate for use with system 10. FIGS. 5 and 6 illustrate is a lower pressure version of an argon cycle. The argon cycle of FIG. 1 is shown with a top pressure of approximately 1000 atm. FIGS. 5 and 6 illustrate a lower pressure argon system 110 that reaches approximately 200 atm. A small bleed flow through a bleed turbine 30 from the low pressure return heat transfer coil 24 is taken and re-injected downstream to tank 111 at an appropriate pressure.

Figure 7A:
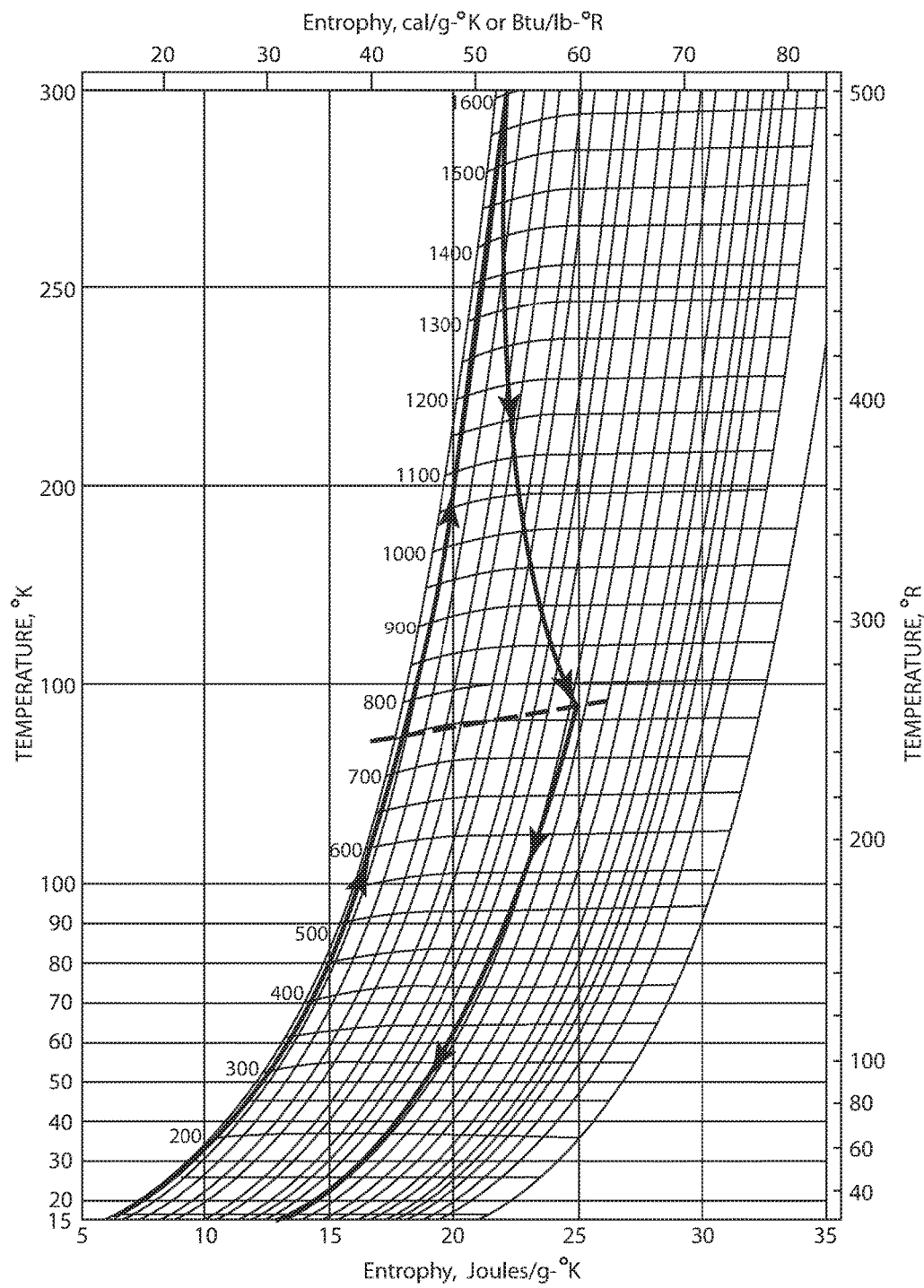
FIG. 7a is the power portion of a T vs. S diagram of a system using helium as the working fluid.
Figure 7B:
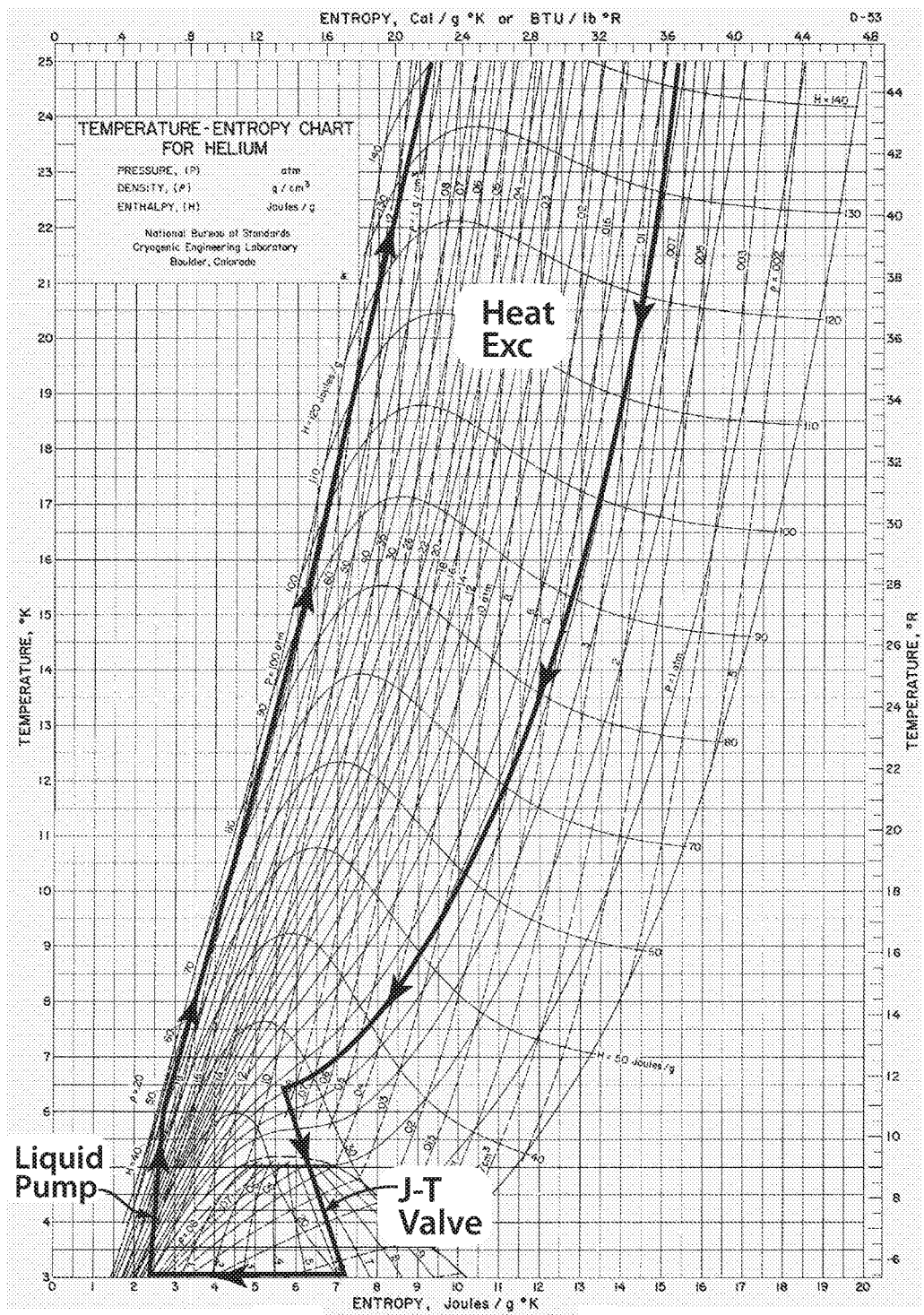
Figure 8A:
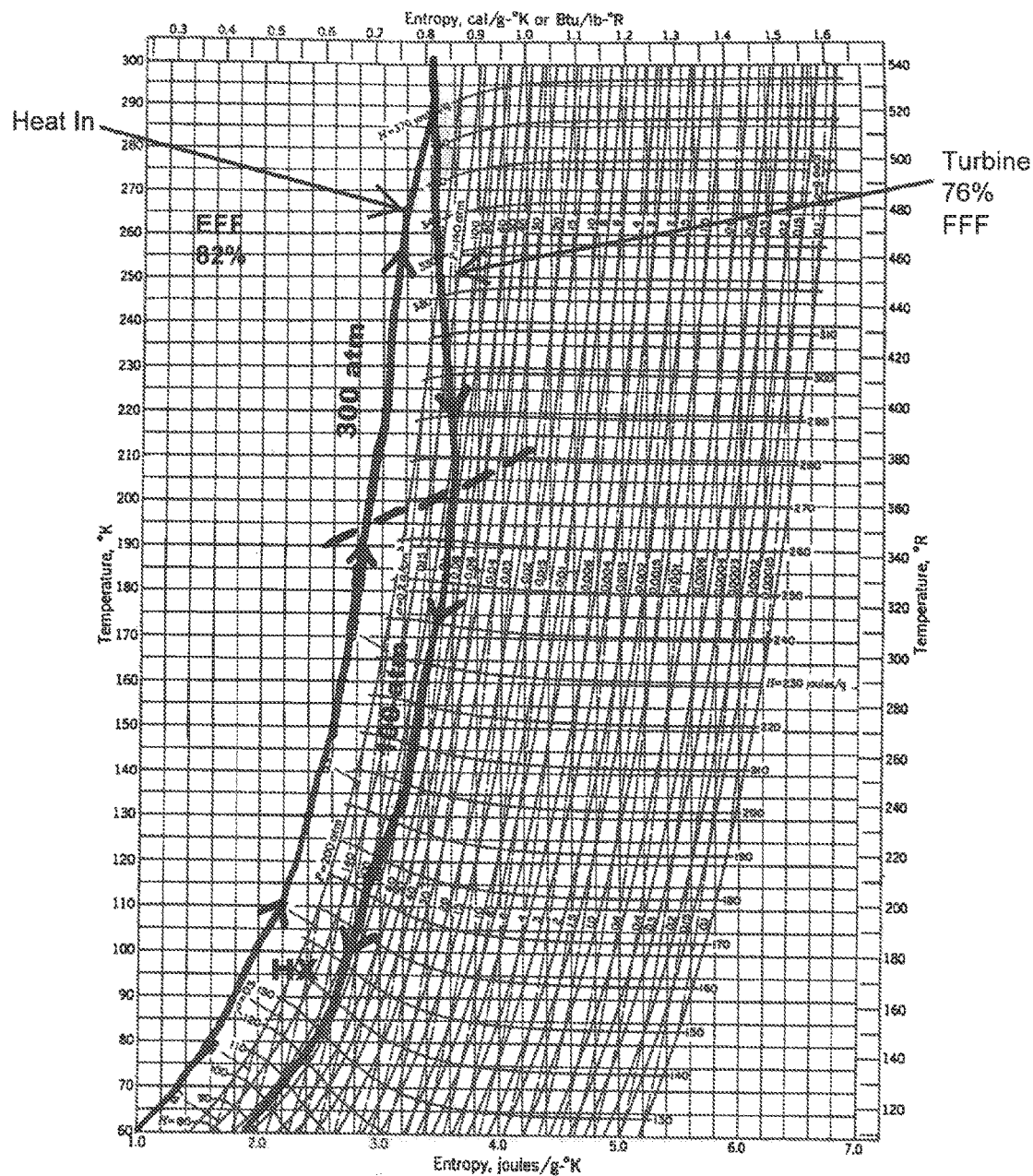
FIG. 8a is the power portion of a T vs. S diagram of a system using neon as the working fluid at high temperature.
Figure 8B:
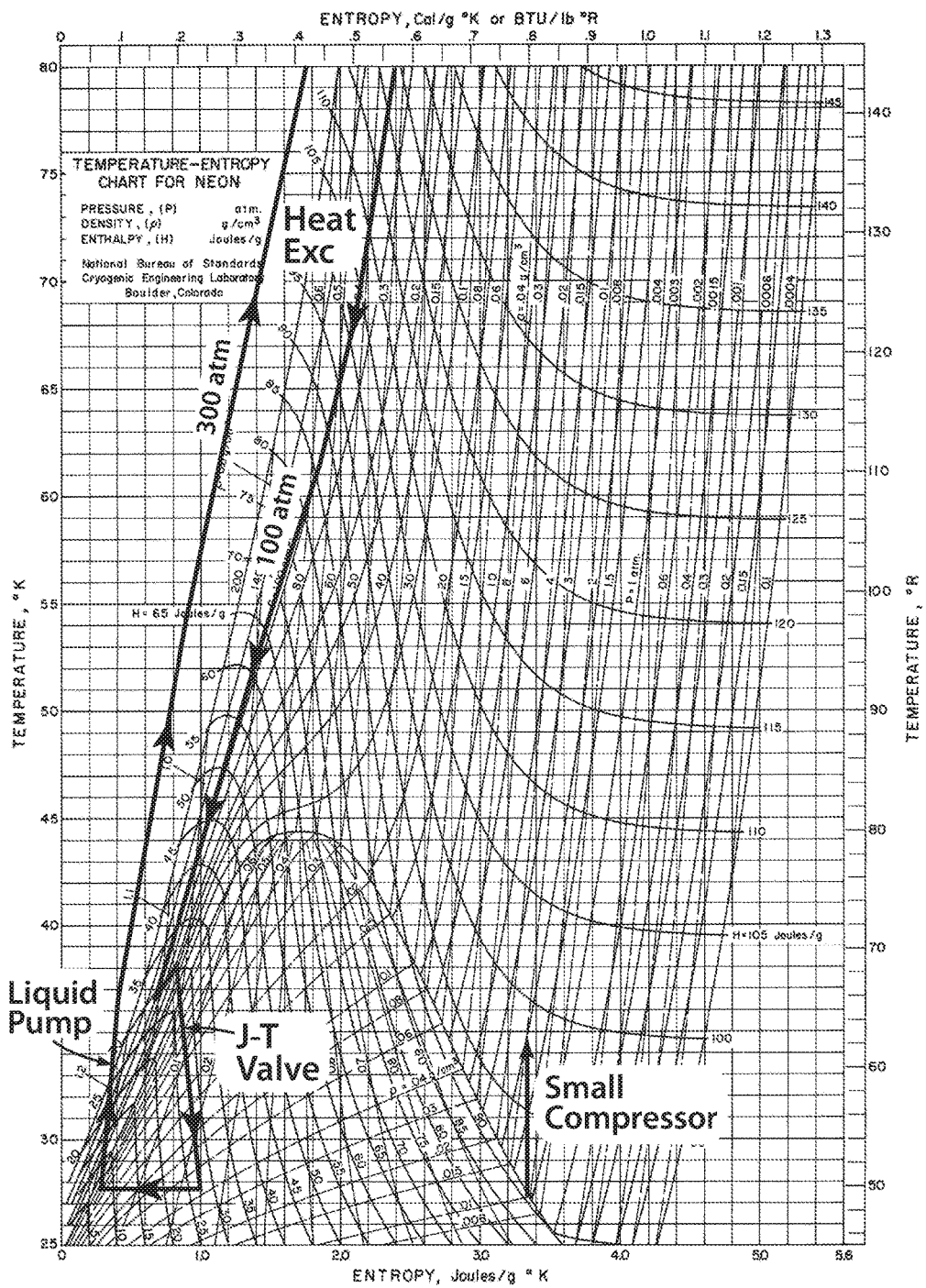

FIGS. 7a and 7b show the T vs. S diagram for helium as a working fluid at temperatures below 300 degrees K. Helium is viable for these systems since it operates at reasonable low pressures. However, helium is in short supply and for high flow applications, neon may be a preferable working fluid. Neon is shown in FIGS. 8a and 8b. Neon also operates at low enough pressures to be viable.

Figure 9:
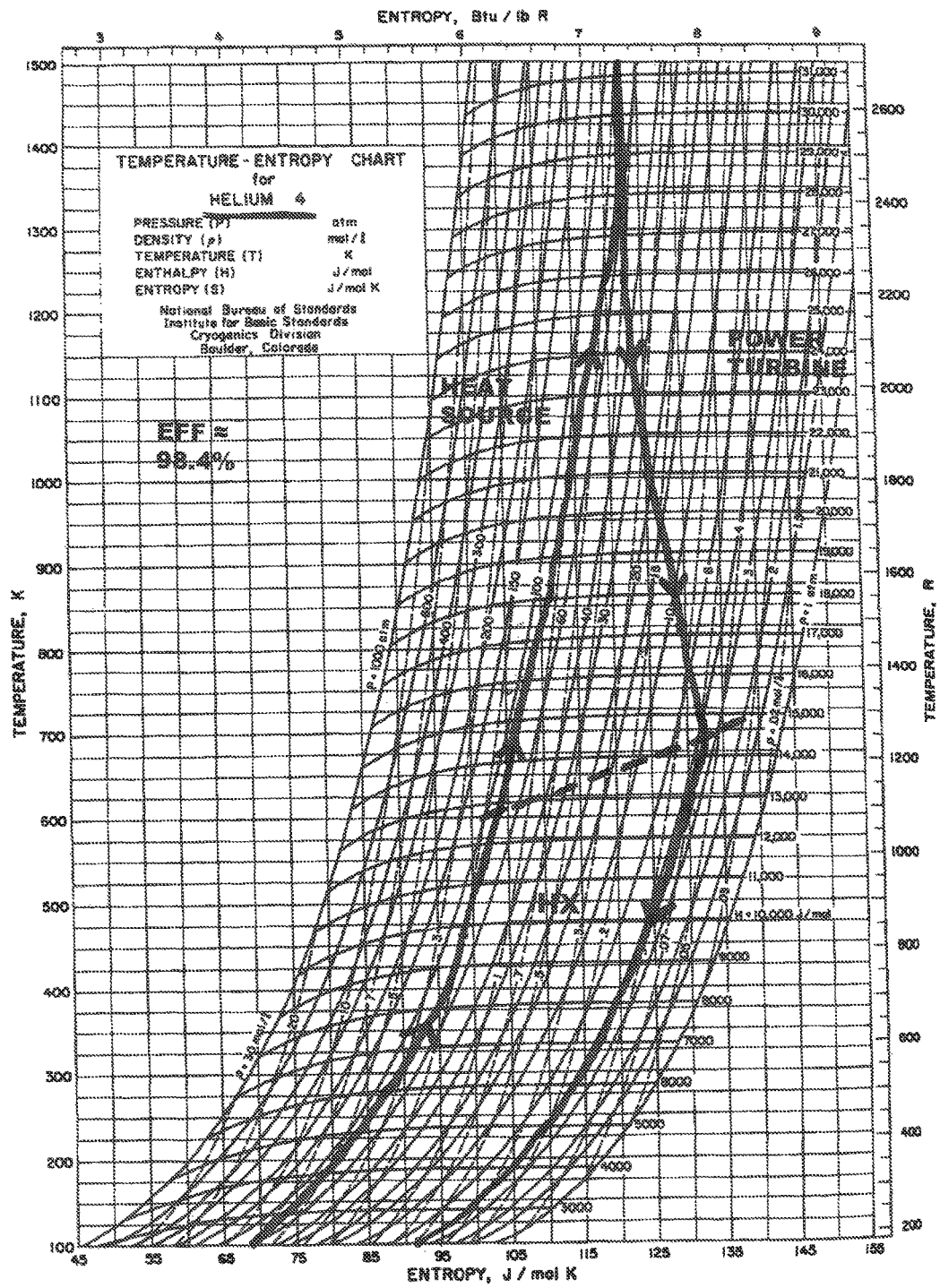
FIG. 9 is the power portion of the T vs. S diagram of a system using helium as a working fluid.
Figure 10:
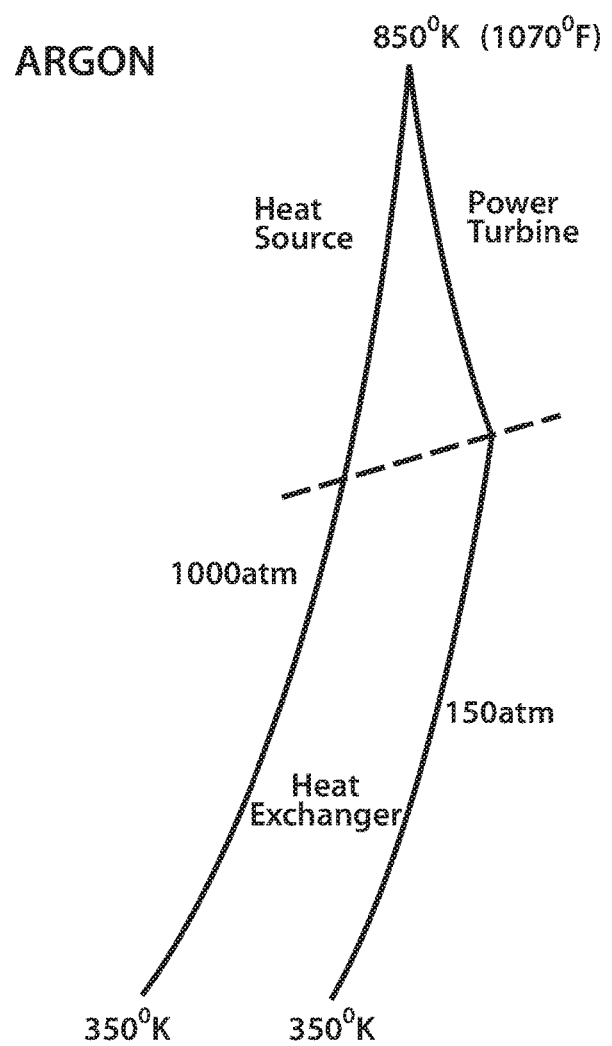
FIG. 10 is the power portion of the T vs. S diagram of a system using argon as a working fluid at high temperatures.

FIG. 9 shows that helium can be used as a working fluid all the way up to at least 2700 degrees Rankine (3160 Fahrenheit). Since helium is a monatomic fluid, it will not disassociate at these high temperatures, which enables it to be used for most engine processes. FIG. 10 shows that other noble (monatomic) fluids such as argon can also operate well above cryogenic temperatures and can be potentially used in combustion and nuclear power cycles.

Figure 11:
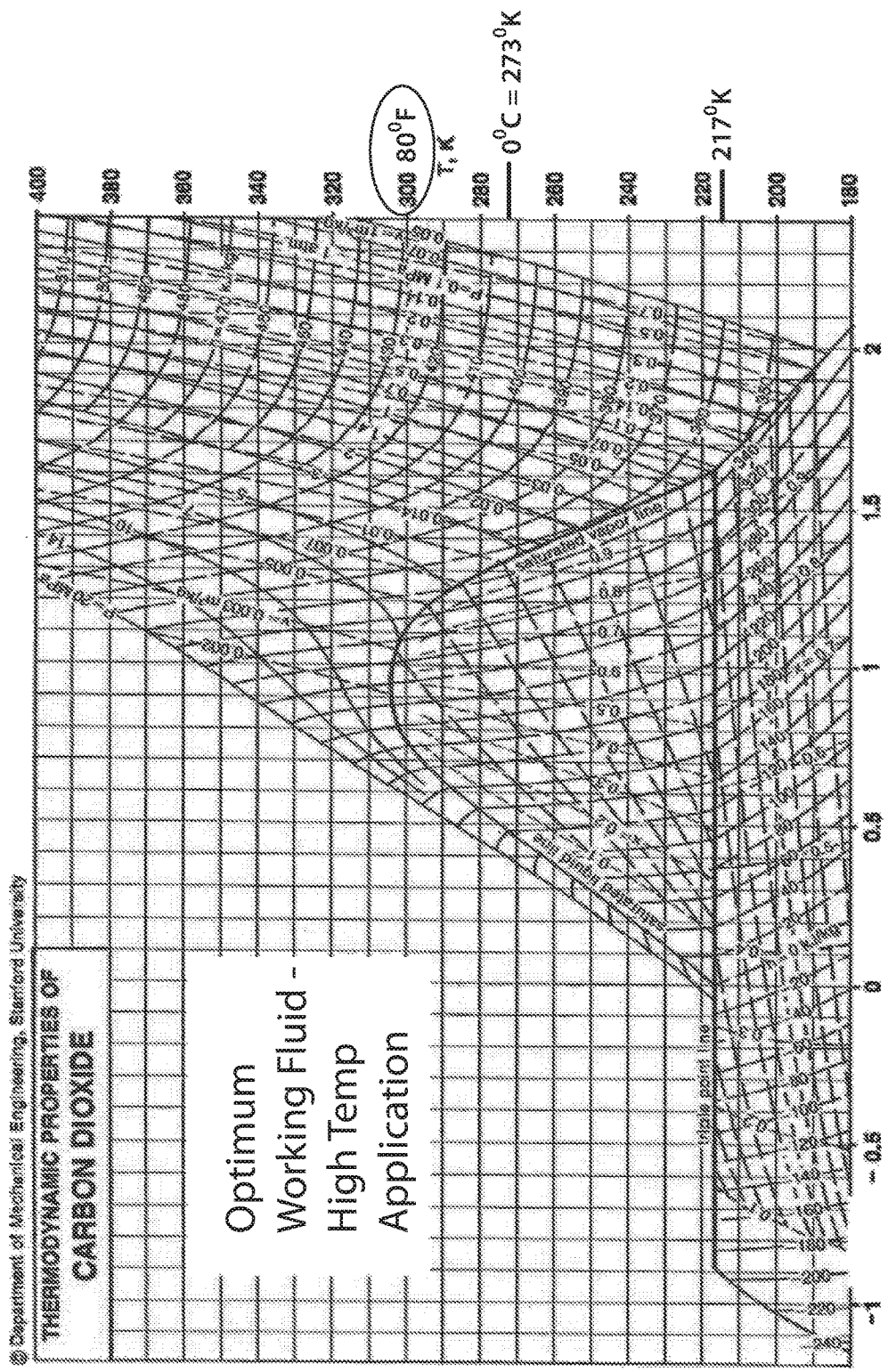
FIG. 11 is a T vs. S. diagram of carbon dioxide.

FIG. 11 shows the wet region of carbon dioxide. Carbon dioxide, or blended with other fluids such as ammonia, might function well with the systems disclosed herein. Hot carbon dioxide is one of the power producing fluids in existing engines and power plants. It is typically discharged to atmosphere and is a greenhouse gas. Thus, its use in an ultra-high-efficiency thermodynamic system will have the added benefit of turning a harmful byproduct into a useful ingredient.

Figure 12:
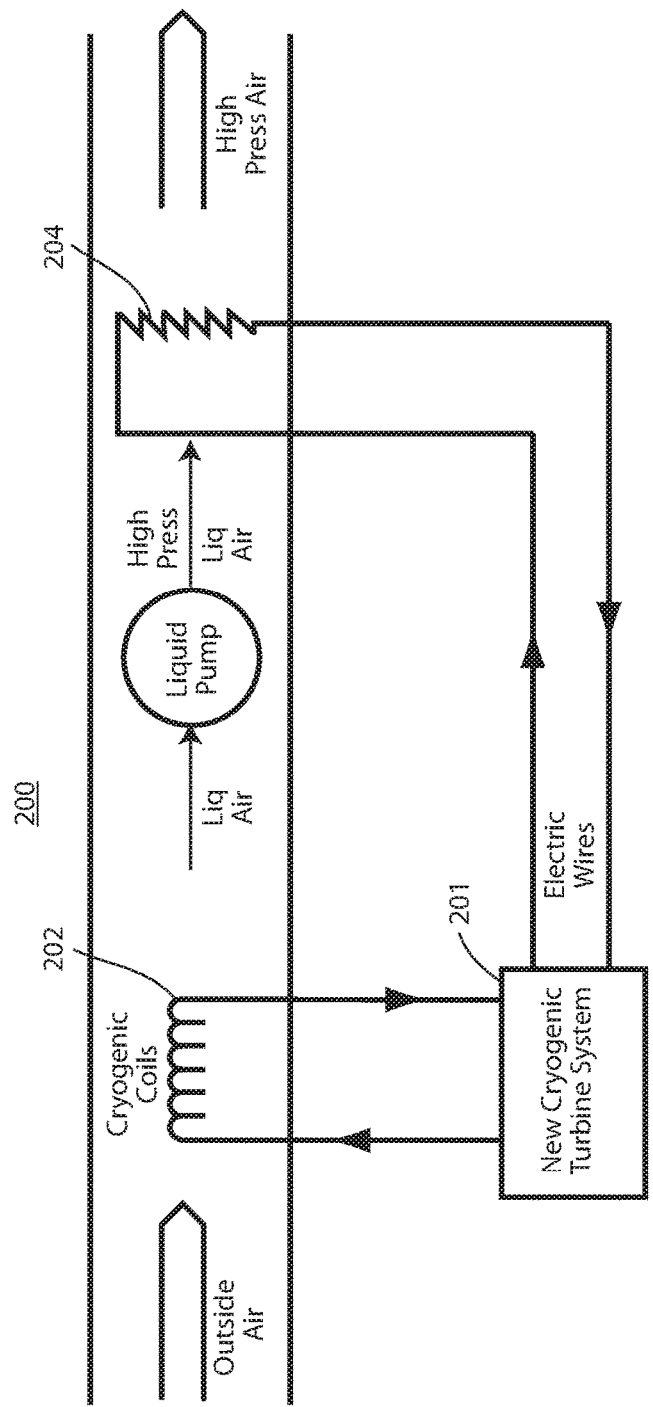
FIG. 12 is a block diagram of a high pressure air system according to an embodiment of the invention.

The present invention may also be embodied in high pressure ratio jet engines and air conditioners that produce electric power instead of consuming it. FIG. 12 shows the basic concept of a high pressure ratio jet engine 200 using a system process 201. A very low temperature cryogenic coil 202 is used to cool incoming air to liquid air. The liquid air is then pumped to a very high pressure with a liquid pump 203 and then heated by a heater 204, using output power of system process 201, back to a gas. In some cases, all or part of the generated power is used to perform other functions on the airplane.

Figure 13:
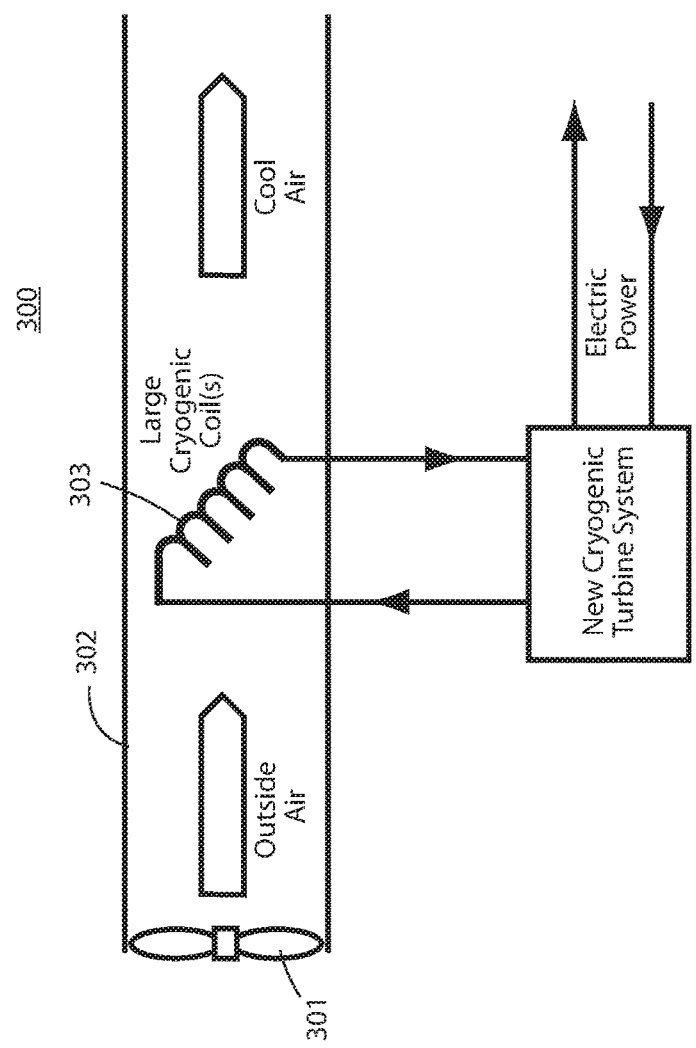
FIG. 13 is a block diagram of a system according to an embodiment of the invention that produces power as well as cool air.

FIG. 13 shows an air conditioner 300. A battery or generator driven fan 301 brings hot outside air into a duct or chamber 302 cooled by a very low temperature cryogenic coil 303. The new cycle recharges the battery and produces additional power from the heat (enthalpy) extracted from the air by the cryogenic temperature variant of this new cycle. This version of an air conditioner produces power instead of consuming it, thus contributing greatly to betterment of the environment.

The present invention is embodied in a system which begins at the saturated liquid curve of the T vs. S graph and ends at the same point, thus not substantially rejecting heat other than through miscellaneous heat leaks. Thus, there are a number of "closed-thermodynamic-cycle gas-turbines" on the left side of most T vs. S charts that function with no rejection of heat, except small parasitic insulation heat leaks all are capable of operating with efficiencies well into the 90% bracket.

Thus, it is seen that the present invention provides a totally new cycle/engine, embodied in a single closed thermodynamic cycle of a liquid pump, a heat exchanger, a heat source, and a gas turbine, forming a closed cycle power system based exclusively left of the wet region on a T vs. S plot has been defined. Cryogenic fluids such as helium, neon, argon, nitrogen, and air make it feasible to extract motive power and electricity from ambient heat sources such as ground, water, and air. This cycle is also capable of functioning as a bottoming cycle for steam plants, Diesel trucks, and automobiles. This new cycle is capable of functioning alone to power electric generating plants, trucks, and automobiles, using such ambient based fluids as carbon dioxide. This researcher believes that the Diesel and internal combustion engines, and the steam power plant, all developed in the eighteen hundreds, need to be retired because they are nominally 33% efficient, and dump the nominal 67% balance as heat to the atmosphere. He also believes that the new cycle would be very difficult to integrate into these old systems because there are numerous interface conditions that must be satisfied. This new system could potentially be better engineered as a standalone.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A single loop thermodynamic system, comprising:
   a working fluid;
   a liquid pump elevating pressure of the working fluid in a liquid state;
   a thermal input for supplying heat to the working fluid;
   an expansion device downstream of the thermal input for converting at least the heat of the working fluid to useful work;
   a heat exchanger downstream of said expansion device having a first portion to transfer heat from downstream said expansion device to a second portion at or upstream of said thermal input; and
   a conversion device that is adapted to expand the working fluid with constant enthalpy from a higher to a lower pressure wherein said conversion device is downstream said first portion of said heat exchanger and receives fluid at a same first temperature as discharged by said first portion of said heat exchange wherein said liquid pump is downstream said conversion device and upstream said second portion of said heat exchanger and discharges liquid at a same first temperature as received by said second portion of said heat exchanger.

2. The thermodynamic system as claimed in claim 1 wherein said conversion device comprises at least one chosen from a J-T valve, a liquid turbine, and a gas turbine.

3. The thermodynamic system as claimed in claim 1 wherein said expansion device comprises a power turbine.

4. The thermodynamic system as claimed in claim 1 wherein said conversion device operates at least one chosen from isentropically and isenenthalpally.

5. The thermodynamic system as claimed in claim 1 wherein at least a portion of the cycle is in a cryogenic temperature region.

6. The thermodynamic system as claimed in claim 5 wherein said working fluid is at least one noble gas.

7. The thermodynamic system as claimed in claim 5 wherein said working fluid comprises at least one chosen from helium, neon, or argon.

8. The thermodynamic system as claimed in claim 5 wherein said working fluid comprises krypton or xenon.

9. The thermodynamic system as claimed in claim 1 wherein said working fluid comprises carbon dioxide.

10. The thermodynamic system as claimed in claim 1 wherein said thermal input receives at least one chosen from (i) earth surface sensible heat, (ii) geothermal heat from a geothermal well, (iii) latent heat of surface water, (iv) sensible heat of surface water, or (v) heat from ambient air.

11. The thermodynamic system as claimed in claim 1 used as a power-producing bottoming system for at least one chosen from (i) an existing or new fossil-fuel-fired power plant, (ii) an existing or new nuclear power plant, (iii) an existing or new diesel engine, and (iv) an existing or new internal combustion engine.

12. The thermodynamic system as claimed in claim 1, wherein said working fluid comprises a low temperature hydrocarbon refrigerate.

13. The thermodynamic system as claimed in claim 1 including a tank receiving the working fluid from said conversion device in a liquid and gaseous state, and a gas compressor which compresses working fluid in the gaseous state from the tank and discharges the working fluid between the liquid fluid pump and the thermal input.

14. The thermodynamic system as claimed in claim 1 wherein said working fluid comprises ammonia.

15. A single loop thermodynamic power cycle system, comprising:
   a working fluid having a wet region;
   a liquid fluid pump elevating pressure of the working fluid in a liquid state;
   a thermal input for supplying heat to the working fluid;
   an expansion device downstream of the thermal input for converting at least the heat of the working fluid to useful work;
   a heat exchanger downstream of said expansion device having a first portion to transfer heat from downstream said expansion device to a second portion at or upstream of said thermal input; and
   a conversion device that is adapted to convert the working fluid to a fluid which is supplied to the liquid pump, wherein said conversion device is downstream said first portion of said heat exchanger and wherein said liquid pump is downstream said conversion device and upstream said second portion of said heat exchanger and discharges liquid, wherein said liquid fluid pump, said thermal input, said expansion device, said heat exchanger and said conversion device are configured to cause the working fluid to operate without completely crossing the wet region of the working fluid.

16. The thermodynamic power cycle system as claimed in claim 15 wherein said conversion device comprises a J-T valve.

17. The thermodynamic power cycle system as claimed in claim 15 wherein said expansion device comprises a power turbine.

18. The thermodynamic power cycle system as claimed in claim 15 wherein said conversion device operates at least one chosen from isentropically and isenenthalpally.

19. The thermodynamic power cycle system as claimed in claim 15 wherein at least a portion of the cycle is in a cryogenic temperature region.

20. The thermodynamic power cycle system as claimed in claim 19 wherein said working fluid is at least one noble gas.

21. The thermodynamic power cycle system as claimed in claim 20 wherein said working fluid comprises at least one chosen from helium, neon, or argon.

22. The thermodynamic power cycle system as claimed in claim 15 wherein said working fluid comprises carbon dioxide.

23. The thermodynamic power cycle system as claimed in claim 15 wherein said thermal input is configured to receive at least one chosen from (i) earth surface sensible heat, (ii) geothermal heat from a geothermal well, (iii) latent heat of surface water, (iv) sensible heat of surface water, and (v) heat from ambient air.

24. The thermodynamic power cycle system as claimed in claim 15 used as a power-producing bottoming system for at least one chosen from (i) an existing or new fossil-fuel-fired power plant, (ii) an existing or new nuclear power plant, (iii) an existing or new diesel engine, and (iv) an existing or new internal combustion engine.

25. The thermodynamic power cycle system as claimed in claim 15, wherein said working fluid comprises a low temperature hydrocarbon refrigerant.

26. The thermodynamic power cycle system, as claimed in claim 15 including a tank receiving the working fluid from said conversion device in a liquid and gaseous state, and a gas compressor which compresses working fluid in the gaseous state from the tank and discharges the working fluid between the liquid fluid pump and the thermal input.

27. The thermodynamic power cycle system as claimed in claim 26 wherein the said conversion device receives fluid at a same first temperature as discharged by said first portion of said heat exchange and wherein said liquid pump discharges fluid as a same second temperature as received by said second portion of said heat exchanger.

28. The thermodynamic power cycle system as claimed in claim 15 wherein the said conversion device receives fluid at a same first temperature as discharged by said first portion of said heat exchange and wherein said liquid pump discharges fluid as a same second temperature as received by said second portion of said heat exchanger.

29. The thermodynamic power cycle system as claimed in claim 15 wherein said working fluid comprises ammonia.

30. A thermodynamic method for performing work, comprising:

providing a working fluid;

pumping said working fluid with a fluid liquid pump through a single loop cycle including elevating pressure of the working fluid in a liquid state;

supplying heat to the working fluid with a thermal input;

expanding the heated working fluid downstream of the thermal input;

exchanging heat from a first portion of a heat exchanger downstream of the expansion device to upstream of the thermal input with a second portion of a heat exchanger; and expanding the working fluid with constant enthalpy using a conversion device from a higher to a lower pressure, said conversion device being located downstream of said first portion of said heat exchanger and receiving fluid at a same first temperature as discharged by said first portion of said heat exchanger, wherein said liquid pump is downstream of said conversion device and upstream of said second portion of said heat exchanger and discharges liquid at the same first temperature as received by said second portion of said heat exchanger.

* * * * *